United States Patent [19]
Paul et al.

[11] Patent Number: 5,794,011
[45] Date of Patent: Aug. 11, 1998

[54] METHOD OF REGULATING THE PERFORMANCE OF AN APPLICATION PROGRAM IN A DIGITAL COMPUTER

[75] Inventors: Derek William Paul, Mission Viejo; Loren C. Wilton, Hermosa Beach; Frederick Joseph Barker, Laguna Niguel, all of Calif.

[73] Assignee: Unisys Corporation, Blue Bell, Pa.

[21] Appl. No.: 686,612

[22] Filed: Jul. 19, 1996

[51] Int. Cl.$^6$ ........................................ G06F 9/00
[52] U.S. Cl. ............................... 395/500; 395/552
[58] Field of Search ........................ 395/500, 556, 395/555, 800.43, 183.14, 704, 670, 552; 370/465

[56] References Cited

U.S. PATENT DOCUMENTS

| | | | |
|---|---|---|---|
| 4,727,491 | 2/1988 | Culley | 395/500 |
| 4,882,727 | 11/1989 | Williams et al. | 370/465 |
| 4,893,271 | 1/1990 | Davis et al. | 395/556 |
| 5,086,387 | 2/1992 | Arroyo et al. | 395/556 |
| 5,483,659 | 1/1996 | Yamamura | 395/800.43 |
| 5,511,209 | 4/1996 | Mensch, Jr. | 395/555 |

*Primary Examiner*—Kevin J. Teska
*Assistant Examiner*—Dan Fiul
*Attorney, Agent, or Firm*—Charles J. Fassbender; Mark T. Starr; Steven R. Petersen

[57] ABSTRACT

A performance regulator program monitors and controls in real time, the performance level which an application program achieves when it is executed on a digital computer. With this performance regulator program, any external units which are coupled to the computer are prevented from being overloaded by excessive performance in the application program. Also with this performance regulator program, several models of the application program can be easily generated such that each model achieves a different performance level.

14 Claims, 8 Drawing Sheets

```
START_LOOP:
32a ──→ READ TIME OF DAY(T1)
32b ──→ READ MACHINE CYCLE COUNTER(C1)
32c ──→ READ TIME OF DAY(T2)
32d ──→ IF (T2<>T1) GOTO START_LOOP

32e ──→ PEFORM SOME SERIES OF OPERATIONS

END_LOOP:
32f ──→ READ TIME OF DAY(T3)
32g ──→ READ MACHINE CYCLE COUNTER(C2)
32h ──→ READ TIME OF DAY(T4)
32i ──→ IF (T4<>T3) GOTO START_LOOP

32j ──→ PROCESSOR_SPEED=(C2-C1)/(T4-T2)
```

FIG. 3

| COMPUTER CLOCK FREQUENCY | PERMITTED PERFORMANCE LEVEL | TARGET % RUN TIME |
|---|---|---|
| 75 MHz | 200 RPM | 100% |
| 75 MHz | 100 RPM | 50% |
| 100 MHz | 100 RPM | 37.5% |
| 133 MHz | 100 RPM | 28.1% |
| 166 MHz | 100 RPM | 22.5% |

FIG. 4

51a → @ t2 ~ ACTUAL %RT = $\frac{RT}{TOD2-TOD1}$ = $\frac{20MS}{20MS}$ = 100%

51b → TARGET = 50% = $\frac{RT}{TOD2-TOD1+\Delta}$ = $\frac{20MS}{20MS+\Delta}$

51c → ∴ Δ = 20MS

52a → @ t3 ~ ACTUAL %RT = $\frac{RT}{TOD3-TOD1}$ = $\frac{20MS}{78MS}$ = 25.6%

53a → @ t4 ~ ACTUAL %RT = $\frac{RT}{TOD4-TOD1}$ = $\frac{40MS}{98MS}$ = 40.8%

54a → @ t5 ~ ACTUAL %RT = $\frac{RT}{TOD5-TOD1}$ = $\frac{60MS}{118MS}$ = 50.8%

54b → TARGET = 50% = $\frac{RT}{TOD5-TOD1+\Delta}$ = $\frac{60MS}{118MS+\Delta}$ 54c → ∴ Δ = 2MS 55a → @ t6 ~ ACTUAL %RT = $\frac{RT}{TOD6-TOD1}$ = $\frac{80MS}{138MS}$ = 57.9%

55b → TARGET = 50% = $\frac{RT}{TOD6-TOD1+\Delta}$ = $\frac{80MS}{138MS+\Delta}$ 55c → ∴ Δ = 22MS

FIG. 6

60 → ACTUAL %RT = $\dfrac{RT}{RT + INSERTED\ DELAYS}$

61 → TARGET = $\dfrac{RT}{RT + INSERTED\ DELAYS + \Delta}$

62 → IF $\Delta > 10MS$, THEN

63 → DO

64 → X = TIME OF DAY NOW

65 → BRANCH TO OP SYSTEM WITH DELAYED RETURN OF AT LEAST $\Delta$

66 → Y = TIME OF DAY NOW

67 → ACTUAL DELAY = Y − X

68 → INSERTED DELAYS = ACTUAL DELAY + INSERTED DELAYS

69 → END

|  | t2 | t3 | t4 | t5 | t6 | t7 |
|---|---|---|---|---|---|---|
| 61' Δ = | 20MS |  | -18MS | 2MS | 22MS |  |
| 64' X = | 00:20 |  |  |  | 00:138 |  |
| 66' Y = |  | 00:78 |  |  |  | 00:183 |
| 67' ACTUAL DELAY = |  | 58MS |  |  |  | 45MS |
| 68' INSERTED DELAYS = |  | 58MS |  |  |  | 103MS |

FIG. 9

| MODULE 10b | COMPUTER CLOCK FREQUENCY | PERMITTED PERFORMANCE LEVEL | TARGET % RUN TIME |
|---|---|---|---|
| SINGLE PENTIUM™ | 75 MHz | 200 RPM | 100% |
| DUAL PENTIUM™ | 75 MHz | 360 RPM | 100% |
| SINGLE PENTIUM PRO™ | 200 MHz | 800 RPM | 100% |

METHOD OF REGULATING THE PERFORMANCE OF AN APPLICATION PROGRAM IN A DIGITAL COMPUTER

BACKGROUND OF THE INVENTION

This invention relates to methods of regulating the performance level which an application program achieves when it is executed on a digital computer.

Typically, a digital computer is comprised of a digital memory and an instruction execution module. Several different types of application programs are stored in the memory simultaneously, and the instruction execution module is any digital logic circuit which can execute the instructions in those programs. Also stored in the digital memory is an operating system, and it selects respective time slots for each of the application programs to run.

In the above described digital computer, the total number of application programs which are active at any one time instant need not be constant. Consequently, wherever that total number decreases, additional time slots become available for the remaining active application programs to run; and vice versa. Thus, the performance level of the active application programs will vary inversely with the total number of application program that are active.

Further, in any digital computer, a typical instruction execution module executes instructions in synchronization with a clock which runs at a particular frequency. If that clock frequency is varied, the performance level of the active application programs will also vary. Such a variation in clock frequency will occur, for example, if the instruction execution module is upgraded from one model to another which runs at a higher clock frequency.

Due to the above variations in the performance levels of the active application programs, certain problems can occur. For example, a performance level in an application program which occasionally gets too high can cause overloads in other units which interact with the computer. Also, if the performance level of a particular application program can fluctuate widely from a very low level to a very high level, then several models of that program which each have a different performance level are precluded from being generated.

Accordingly, a primary object of the invention is to provide a performance regulator program by which the performance level of any application program is constantly monitored and controlled in real time.

BRIEF SUMMARY OF THE INVENTION

In accordance with the present invention, a method of regulating the performance of an application program in a digital computer, is comprised of the following steps:

1) sensing, by a regulator program in the computer, a clock frequency at which the computer operates;

2) setting, by the regulator program, a target for a percent run time of the application program on the computer as a function of the clock frequency and a particular performance level which is to be permitted;

3) executing the application program on the computer such that jumps are taken repeatedly to the regulator program; and, 4) continuing with the executing step, following each of the jumps, after inserting a respective time delay if the actual percent run time of the application program on the computer exceeds the target; and otherwise, continuing with the executing step without inserting the delay.

With the above performance regulator program, any external units which are coupled to the computer are prevented from being overloaded by excessive performance in the application program. For example, without the regulator program, such overloads can occur in a data file when excessive performance by the application program causes too many accesses from the data file.

Also with the above performance regulator program, several models of the application program can be easily generated such that each model achieves a different performance level. This feature is accomplished in step 2 by setting a different permitted performance level in each model.

BRIEF DESCRIPTION OF THE DRAWINGS

Various preferred embodiments of the present invention are described herein in conjunction with the accompanying drawings wherein:

FIG. 3 shows a preferred sequence of substeps which are performed, as a part of the FIG. 2 regulator program, to determined a computer's clock frequency;

FIG. 4 shows a table which is used, by a part of the FIG. 2 regulator program, to determine a target for a percent run time of an application program;

FIG. 6 shows several calculations which are performed by a portion of the FIG. 2 regulator program to determined a delay which will lower the actual percent run time of an application program to the target;

FIG. 7 shows an alternative embodiment of the portion of the FIG. 2 regulator program which determines the delay that will reduce the actual percent run time of an application program to a target;

FIG. 8 shows the results which occur when the FIG. 7 embodiment is applied to the time sequence of FIG. 5.;

FIG. 9 shows a table which is an alternative to the table of FIG. 4; and,

DETAILED DESCRIPTION

Figure 1:
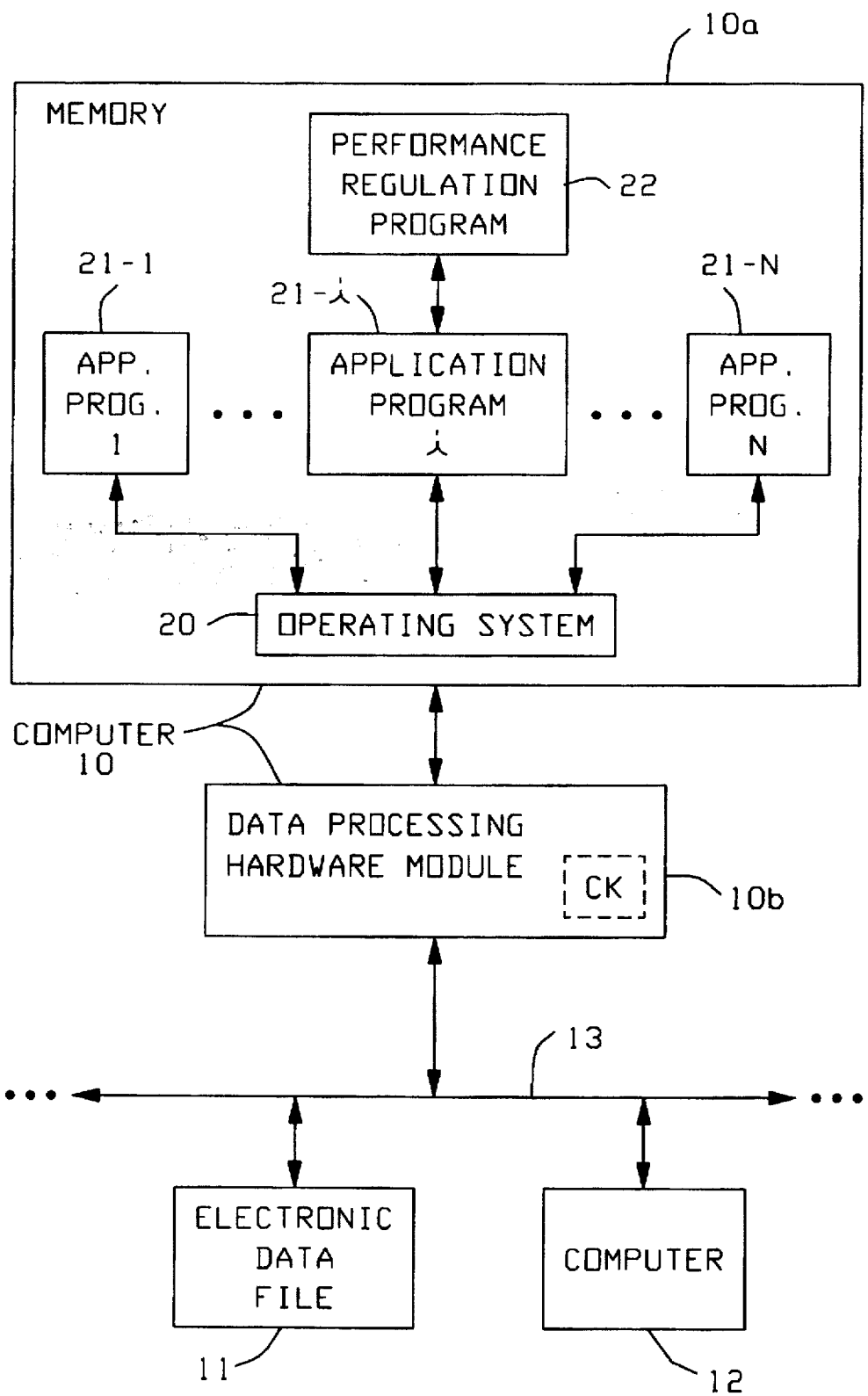
FIG. 1 shows a data processing system which incorporates a performance regulator program in accordance with the present invention.

Referring now to FIG. 1, a data processing system which incorporates the present invention will be described. This FIG. 1 data processing system is comprised of a digital computer 10, an electronic data file 11, and another digital computer 12. Both of the units 11 and 12 are intercoupled to each other and to the computer 10 by a digital communication channel 13, as shown.

Included within the digital computer 10 is a digital memory 10a and an instruction execution module 10b. Several different types of software programs 20, 21-1 through 21-N, and 22 are stored in the memory 10a; and, module 10b is any digital logic circuit which can execute the instructions in those programs. In one particular embodiment, module 10b is a single Pentium™ microprocessor chip which runs at a clock frequency CK.

Each of the programs 21-1 through 21-N in the memory 10a is a conventional application program of any desired type. For example, program 21-1 can be a word processing program such as Winword™; program 21-i can be an emulator which uses Pentium™ instructions to parse and execute instructions of another computer; and program 21-N can be a data retrieval program, such as Lexis™.

All of the application programs 21-1 through 21-N are run on module 10b in a time-shared fashion. Program 20 is an operating system, such as Windows NT™, which selects respective time slots for each of the application programs to run.

Now, in accordance with the present invention, program 22 is a performance regulator program which runs in conjunction with the application program 21-i. Due to the operation of program 22, the performance of the application program 21-i is regulated on a real time basis to not exceed a certain permitted level. For example, the performance of the application program 21-i can be limited to not exceed 100 RPM, where RPM is a relative performance measure.

One way in which the effect of the performance regulation program 22 can be seen is to vary the total number of application programs which are active over time. Whenever that total number decreases, additional time slots become available for the application program 21-i to run on module 10b; and vice-versa. Consequently, without the regulator program 22, the performance level of the application program 21-i will vary inversely with the total number of application programs that are active.

Also, the effect of the performance regulator program 22 can be seen wherever module 10b is upgraded. For example, if module 10b is changed from a 90 MHz Pentium™ chip to a 133 MHz Pentium™ chip, the number of program instructions which are executed in a single time slot will increase. Consequently, without the regulator program 22, the performance level of the application program 21-i will also increase.

One major feature of the performance regulator program 22 is that it prevents each of the units 11–13 from getting overloaded by excessive performance in the application program 21-i. Without the regulator program 22, such overloads can occur if program 21-i makes too many accesses from the data file 11, and/or sends too many messages to the computer 12, and/or transmits too much data to any other units (not shown) on the communication channel 13. With the regulator program 22, such overloads are avoided by limiting the overall performance of program 21-i.

Another major feature of the performance regulator program 22 is that it enables several models of the application program to be easily generated such that each model achieves a different performance level. This feature is accomplished simply by setting a different permitted performance level in each model. For example, the permitted performance level in a first model can be set at 50 RPM; the permitted performance level in a second model can be set at 100 RPM; the permitted performance level in a third model can be set at 150 RPM; etc. This feature may be used either with or without regard to the above overload avoidance feature. For example, different prices can be changed for each model.

Figure 2:
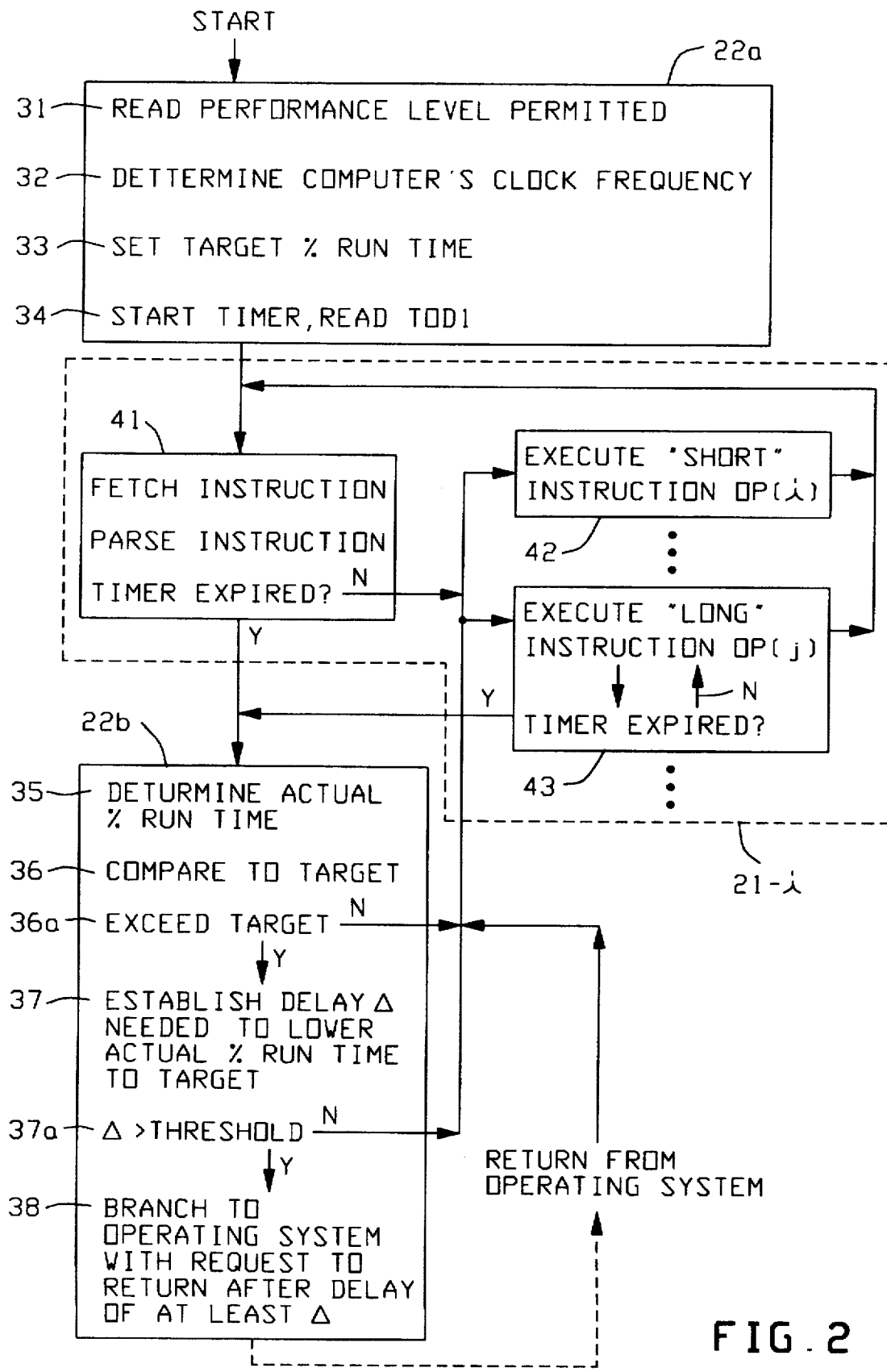
FIG. 2 shows the internal structure for one preferred embodiment of the regulator program in FIG. 1.

Turning next to FIG. 2, the internal structure for one preferred embodiment of the regulator program 22 will be described. In this FIG. 2 embodiment, the regulator program is partitioned into two parts 22a and 22b. Part 22a is executed just one time, which occurs immediately before the application program 21-i starts to run. By comparison, part 22b is executed multiple times in response to jumps which are taken repeatedly from the application program 21-i.

Initially, as indicated by reference numeral 31, the regulator program reads a permitted performance level which has previously been stored for the application program 21-i. Suitably, this permitted performance level can be stored within the application program 21-i, or within the regulator program, or on any media which is readable by module 10b. Next, the regulator program determines the clock frequency CK at which module 10b executes instructions. This step is indicated by reference numeral 32.

Next, the regulator program uses the permitted performance level of step 31 and the clock frequency of step 32 to set a target for the percent run time of the application program 21-i on module 10b. For example, the target might be set at 50%, which means that once the application program 21-i starts, it must not run on module 10b more than half of the time.

Next, the regulator program starts a timer which is included within module 10b or another unit that is accessible by module 10b; and this timer sets the minimum time period which lapses between jumps from the application program 21-i to the regulator program. This step is indicated by reference numeral 34. In that same step, the regulator program also reads the current time of day TOD1 from a time of day clock which is present in module 10b.

Following the above steps 31–34, the execution of the application program 21-i begins. This application program is shown in FIG. 2 as an emulator; but as an alternative, any other type of application program can be substituted for the emulator.

In FIG. 2, three major parts 41, 42, and 43 of the emulator application program 21-i are shown. Part 41 performs the tasks of fetching one of the instructions that are to be emulated, parsing that instruction, and testing the timer which was started in step 34. If the timer has expired, then a jump is taken to part 22b of the regulator program; otherwise, the execution of the application program 21-i continues.

Part 42 of the application program 21-i executes one of the "short" instructions Op(i) which are to be emulated. A "short" instruction is one which takes less than a predetermined amount of time to execute. For each "short" instruction Op(i), a corresponding emulator part 42 is provided. Execution of the emulator part 42 continues until it is completed, and then a branch is taken back to part 41.

Part 43 of the application program executes one of the "long" instructions Op(j) which are to be emulated. For each "long" instruction Op(j), a corresponding emulator part 43 is provided. At predetermined points within each emulator part for a "long" instruction, the timer which is started in step 34 is tested. If that timer has expired, a jump is taken to part 22b of the regulator; otherwise, execution of the long instruction continues.

Each time portion 22b of the regulator program 22 is entered, the actual percent run time of the application program 21-i on module 10b is determined. This actual percent run time is the sum of all spaced apart time periods during which module 10b executes the application program 21-i, divided by the total time which elapses from the beginning to the end of those time periods. This step is identified by reference numeral 35.

Next, portion 22b of the regulator program compares the actual percent run time as determined in step 35 to the target. This step is identified by reference numeral 36. If the actual percent run time does not exceed the target, then a return jump is taken back to the application program 21-i; and this is indicated by step 36a.

By comparison, if the actual percent run time does exceed the target, then steps 37–38 are performed by the regulator program. In step 37, a particular delay Δ is established which will lower the actual percent run time to the target. If the delay Δ is less than a certain preset threshold, then a return jump is taken back to the application program 21-i in step 37a. Otherwise in step 38, a branch is taken back to the operating system with a request to return to the execution of the application program 21-i after a delay of at least Δ is imposed.

During the delay which is initiated by step 38, the operating system 20 will allow other application programs, such as program 21-N, to run on module 10b if those programs are presently active; and consequently, the data processing capacity of module 10b is not wasted. If the application program 21-i is the only application program which is active when the delay from step 38 is being imposed, then the operating system 20 will simply stay in an idle loop until the delay is completed.

Next, with reference to FIG. 3, one preferred method for determining the computer's clock frequency, as required by step 32 in the regulator program, will be described. This FIG. 3 method is comprised of several substeps which are identified in FIG. 3 by reference numerals 32a through 32j. A particular feature this FIG. 3 method is that it is immune to errors which can otherwise be caused by unexpected interrupts.

In substep 32a, the time of day is read; in substep 32b, a machine cycle count C1 is read; and in step 32c, the time of day is again read. Time T1 is the first time of day reading which is obtained by substep 32a; and time T2 is the second time of day reading which is obtained in substep 32c.

Those two time of day readings T1 and T2 are compared to each other in substep 32d. If time T2 minus T1 is more than a preset limit, such as three milliseconds, then substeps 32a–32d are repeated because a time difference above the limit indicates that an interrupt occurred between substep 32a and substep 32c. Such an interrupt destroys the ability to say that count C1 occurred at the time of day T2.

In substep 32e, a particular series of operations is performed; and while this occurs, the machine cycle counter and the time of day clock are incremented dozens of times. Then, the substeps 32f, 32g, and 32h are performed which are similar to the above described substeps of 32a, 32b, and 32c.

Next, substep 32i is performed wherein the time of day readings T3 and T4 which are obtained in substeps 32f and 32h are compared to each other. If time T4 minus time T3 is more than the preset limit, then substeps 32f–32i are repeated because an interrupt must have occurred between substep 32f and substep 32h. Such an interrupt destroys the ability to say that count C2 occurred at time t4.

In substep 32j, the processor's clock frequency is determined as the number of machine cycles which occurred during the time interval T4-T2. That number of cycles equals the count C2 from substep 32g minus the count C1 from substep 32b, regardless of whether or not in interrupt occurred at any point during the series of operations which are performed in substep 32e.

Next, with reference to FIG. 4, one preferred method of setting a target for the percent run time of the application program 20-i will be described for the case where module 10b is a single Pentium™ microprocessor. This setting of the target occurs during the previously described step 33 in FIG. 2.

FIG. 4 is in the form of a table which has several rows and three columns. In each row, the left most entry gives a particular clock frequency for a single Pentium™ microprocessor in module 10b; the next entry gives a permitted performance level which must not be exceeded by the application program 21-i; and the right most entry gives a corresponding target for the percent run time of the application program 21-i.

For example, in the second row of FIG. 4, the clock frequency is 75 MHz; the permitted performance level is 100 RPM; and the target percent run time is 50 percent. This means that if module 10b is a 75 MHz Pentium™ microprocessor, then the application program 20-i will achieve a relative performance level of 100 RPM when that program runs 50% of the time on module 10b.

To generate all of the entries in the FIG. 4 table, the application program 21-i is run on a Pentium™ microprocessor at one particular clock frequency $f_0$ for 100% of the time, and the resulting performance level $P_0$ is measured. Then, to reduce the performance $P_0$ to any permitted performance level PPL while the clock frequency stays at $f_0$, the target for the percent run time is set equal to PPL divided by $P_0$. If the clock frequency is changed to $f_x$ but the permitted performance level stays unchanged, then the target for the percent run time is changed by the ratio of $f_0$ divided by $f_x$.

Figure 5:
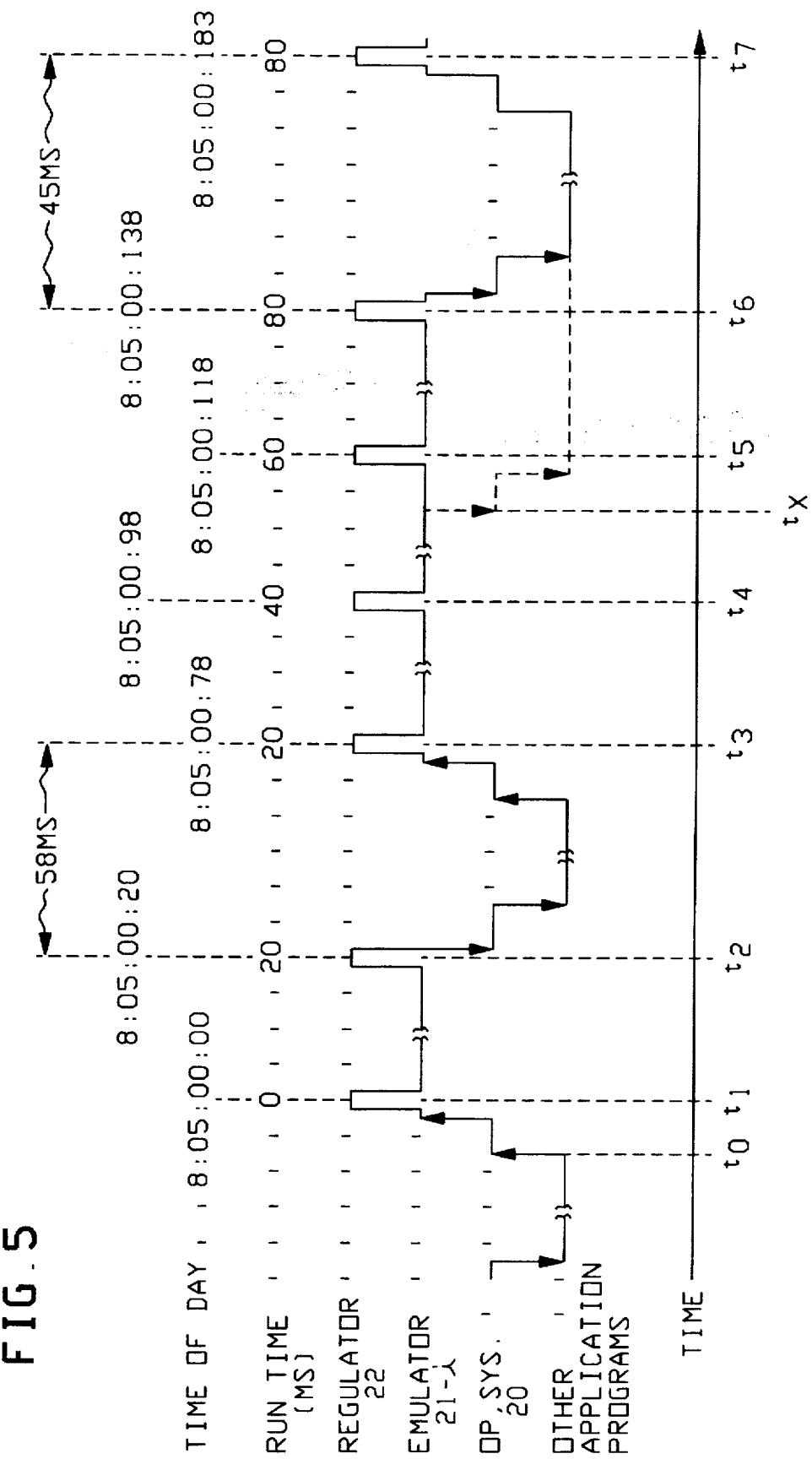
FIG. 5 shows an example of the time sequence by which the FIG. 2 regulator program operates.

Now, referring to FIG. 5, the time sequence by which the regulator program operates will be described in further detail. FIG. 5 is a timing diagram in which time passes from left to right on the horizontal axis. Prior to time $t_0$, one of the other application programs (such as program 21-N) is running on module 10b.

At time $t_0$, the operating system 20 terminates the running of that other application program because its time slot has ended. Then, between time $t_0$ and $t_1$, the operating system 20 decides to start the emulator program 21-i; and so at time $t_1$, a the time slot is given by the operating system to the emulator program.

Starting at time $t_1$, portion 22a of the regulator program is performed as was previously described in conjunction with FIG. 2. There, a target is set for the percent run time of the emulator program 21-i. Also a timer is started which will cause jumps to be taken repeatedly from the emulator program to the regulator program; and the initial time of day TOD1 is read.

In FIGS. 2 and 5, the time between jumps is set at twenty milliseconds as an example. Also, as an example, the initial time of day TOD1 is set at 8:05:00:00. All time of day reading are given in hours: minutes: seconds: and milliseconds.

Following the above operations by portion 22a of the regulator program, the execution of the emulator program 21-i actually begins. Execution of the emulator program 21-i continues until time $t_2$ at which point a jump is taken to portion 22b of the regulator program. This jump occurs in response to an expired timer which was started in step 34 FIG. 2 and tested in portions of 41 and 43 of the emulator program, as previously described.

Starting at time $t_2$, the regulator program 22 determines if the actual percent run time of the application program exceeds the target. In making that determination, the regulator program finds that between time $t_1$ (when the emulator program first started) and the current time $t_2$, the emulator program ran 100% of the time.

In order to reduce the actual percent run time, to the target, a delay Δ of twenty milliseconds needs to be inserted. Consequently, the regulator program branches to the operating system with a request to return only after delay of at least Δ has elapsed.

In response to the above branch, the operating system allows another application program to run. This other application program continues to run until the operating system 20 decides to give additional run time to the emulator 21-i. In FIG. 5, such additional run time is given to the emulator starting at time $t_3$.

During the time interval of $t_2$ to $t_3$, the timer again expires. Consequently, a jump is taken to portion 22b of the regulator program shortly after time $t_3$. There, the actual percent run time is determined to be less than the target; and thus a return jump is made back to the emulator 21-i.

Thereafter up to time $t_4$, the emulator program continuously runs on module 10b. Then, at time $t_4$, a jump is taken from the emulator program to portion 22b of the regulator program. This jump occurs in response to another expiration of the timer which was started in step 34 of FIG. 2.

During the jump to the regulator program at time $t_4$, the actual percent run time is again compared to the target percent run time. By making this comparison, a determination is made that the actual percent run time does not exceed the target. Consequently, portion 22b of the regulator program makes a return jump back to the emulator program, rather than a jump to the operating system.

From time $t_4$ to time $t_5$, execution of the emulator program continues. Then, at time $t_5$, another jump is taken to portion 22b of the regulator program in response to another expiration of the timer.

When the regulator program is entered at time $t_5$, the actual percent run time of an emulator program is again compared to the target percent run time. This comparison shows that the actual percent run time does exceed the target; but the difference between them does not exceed a pre-established threshold. Consequently, another return jump is taken from the regulator program back to the emulator program.

Execution of the emulator program continues from time $t_5$ to time $t_6$; and then, another jump occurs to portion 22b of the regulator program due to the timer expiring. Then, the regulator program determines that the actual percent run time of the emulator program exceeds the target by more than the threshold amount.

In order to reduce the actual percent run time to the target, a delay $\Delta$ of twenty-two milliseconds needs to be inserted. Consequently, the regulator program branches to the operating system with the request to return to the emulator program after a delay of at least $\Delta$ occurs.

In response to this branch, the operating system permits other application programs to run. Then, at time $t_7$ the operating system again allows the execution of the emulator program to continue. During this execution of the emulator, jumps are repeatedly taken to the regulator program, similar to those which occurred between time $t_3$ and time $t_6$.

How portion 22b of the regulator program determines the actual percent run time, and establishes the delay $\Delta$ which is needed to lower the actual percent run time, is shown in FIG. 6. There, line 51a says that at time $t_2$, the actual percent run time of the emulator 21-i is equal to the run time RT of the emulator divided by TOD2-TOD1. In line 51a, TOD2 is the time of day at time $t_2$ and TOD1 is the time of day at time $t_1$.

Run time RT of the emulator 21-i is kept by the operating system; and it is sensed by the regulator through the execution of a "read run time" command. Current time of day is kept by a time of day clock within module 10b, and it is sensed by the regulator through the execution of a "read time of day" command.

In line 51b, the target of 50% is set equal to the run time RT divided by the quantity TOD2-TOD1+$\Delta$. Solving line 51b for $\Delta$ gives the delay which must be inserted at time $t_2$ to lower the actual percent run time to 50%. That delay $\Delta$ is determined in line 51 to be twenty milliseconds.

Line 52a says that at a time $t_3$, the actual percent run time of the emulator 21-i equals the run time RT of the emulator divided by TOD3-TOD1. Here, TOD3 is the time of day at time $t_3$. At time $t_3$, the actual percent run time is below the target; and consequently, no delay is inserted.

Similarly, line 53a says that at a time $t_4$, the actual percent run time of the emulator 21-i equals the run time RT of the emulator divided by TOD4-TOD1. Here, TOD4 is the time of day at time $t_4$. At time $t_4$, the actual percent run time is below the target; and consequently, no delay is inserted.

Line 54a says that at time $t_5$, the actual percent run time of the emulator 21-i equals the run time RT of the emulator divided by TOD5-TOD1; where TOD5 is the time of day at time $t_5$. This yields an actual percent run time of 50.8% which is above the target.

In line 54b, the target of 50% is set equal to the run time RT divided by the quantity TOD5-TOD1+$\Delta$. Solving line 54b for $\Delta$ gives a delay of two milliseconds as shown in line 54c which must be inserted to lower the actual percent run time to 50%. However, this two millisecond delay is not inserted because it does not exceed the pre-established threshold.

Line 55a says that at time $t_6$, the actual percent run time of the emulator 21-i equals the run time RT of the emulator divided by TOD6-TOD1. This yields an actual percent run time of 57.9%. In line 55b, the target of 50% is set equal to the run time RT divided by the quantity TOD6-TOD1+$\Delta$. Solving line 55b for $\Delta$ gives a delay of twenty-two milliseconds as shown in line 55c.

One preferred embodiment of the invention has now been described in detail. Now, in conjunction with FIGS. 7, 8, 9, and 10, some alternative preferred embodiments of the invention will be described.

In FIG. 7, steps 60-69 as shown comprise an alternative embodiment of portion 22b of the regulator program in FIG. 2. With this FIG. 7 embodiment, the actual percent run time of an application program 21-i is defined by step 60 as the run time RT of that application program divided by that run time plus all delays which are inserted by the regulator program.

If the actual percent run time of step 60 exceeds the target, then by step 61 a delay $\Delta$ is found such that the run time RT of the application program, divided by the run time plus all prior inserted delays plus the delay $\Delta$, equals the target. If the delay $\Delta$ is greater than a preset threshold (such as ten milliseconds), then steps 62 and 63 say that the remaining steps 63 through 69 are performed.

In step 64, the current time of day X is read. In step 65, a branch is taken from the regulator program to the operating system with a request to return after a delay of at least $\Delta$ has occurred. Later, when that return from the operating system takes place, step 66 is performed wherein the current time of day Y is read. Then, in step 67, the duration of the actual delay which took place between step 64 and step 66 is determined as the quantity Y-X. In step 68, the actual delay of Y-X is added to all previously inserted delays to get the current total of all inserted delays.

When the regulator program of FIG. 7 is applied to the timing diagram of FIG. 5, the results which occur at various steps in the program are shown in FIG. 8. That figure contains a table wherein the columns correspond to time instants in FIG. 5, and the rows correspond to steps in FIG. 7. For example, the FIG. 8 entry at column t2, row 61', is twenty milliseconds; and that means that the delay Δ is twenty milliseconds when step 61 of FIG. 7 is applied at time t2 in FIG. 5. Similarly, the FIG. 8 entry at column t3, row 67', is 58 milliseconds; and that means that an actual delay of 58 milliseconds is found when step 67 is applied at time t3 in FIG. 5.

One particular feature of using step 60 in FIG. 7 to determine the actual percent run time, is that delays in the run time of the application program 21-i which are initiated by the operating system are ignored. For example, if the operating system initiates the termination of the running of the emulator program in FIG. 5 at time $t_x$ as indicated by the dashed line, then the delay in the running of the emulator which occurs from time $t_x$ to time $t_7$ is ignored in step 60 of FIG. 7. That delay is also ignored by step 61 of FIG. 7.

By comparison, with the first embodiment of the regulator program which was described in conjunction with FIG. 6, a delay in the running of the emulator from time $t_x$ to time $t_7$ which is initiated by the operating system will not be ignored. With the FIG. 6 embodiment, the actual percent run time at time $t_7$ will equal the total run time of the emulator up to time $t_7$ divided by TOD7-TOD1.

Next, reference should be made to FIG. 9 wherein a table is shown which constitutes an alternative embodiment of the previously described table in FIG. 4. With this FIG. 9 embodiment, the target for the percent run time of application program 21-i is correlated to several different models of a microprocessor, each of which can be incorporated into module 10b as an alternative.

For example, the first row of the FIG. 9 table says that with a target percent run time of 100%, the application program 21-i will have a performance level of 200 RPM when that program is exceeded by a single 75 MHz Pentium™ microprocessor within module 10b. Similarly, the second row of FIG. 9 says that with a target percent run time of 100%, the application program 21-i will have a performance level of 300 RPM when that program is executed by dual 75 MHz Pentium™ microprocessors within module 10b. Likewise, the third row of FIG. 9 says that with a percent run time of 100%, the application program will have a performance level of 240 RPM when that program is executed by a single 75 MHz Pentium Pro™ microprocessor within module 10b.

To generate the entries in all three rows of FIG. 9, the application program 21-i is run on each of the three computer models which are listed with a clock frequency of 75 MHz for 100% of the time, and the resulting performance level in each case is measured. Then, to determine what the target percent run time should be in order to reduce the above performance level to any lower performance level while the clock frequency either stays at 75 MHz or is changed, the same procedure is used as was previously described in conjunction with FIG. 4. By performing this step, a separate FIG. 4 is generated for each embodiment of module 10b that is listed in FIG. 9.

Next, with reference to FIG. 10, a modified embodiment of the regulator program in FIG. 2 will be described. In the FIG. 10 embodiment, the regulator program is partitioned into two parts 22a' and 22b'. Part 22a' is executed just one time, which occurs immediately before the application program 21-i starts to run. Part 22b' is executed multiple times in response to jumps which are taken repeatedly from the application program 21-i.

Figure 10:
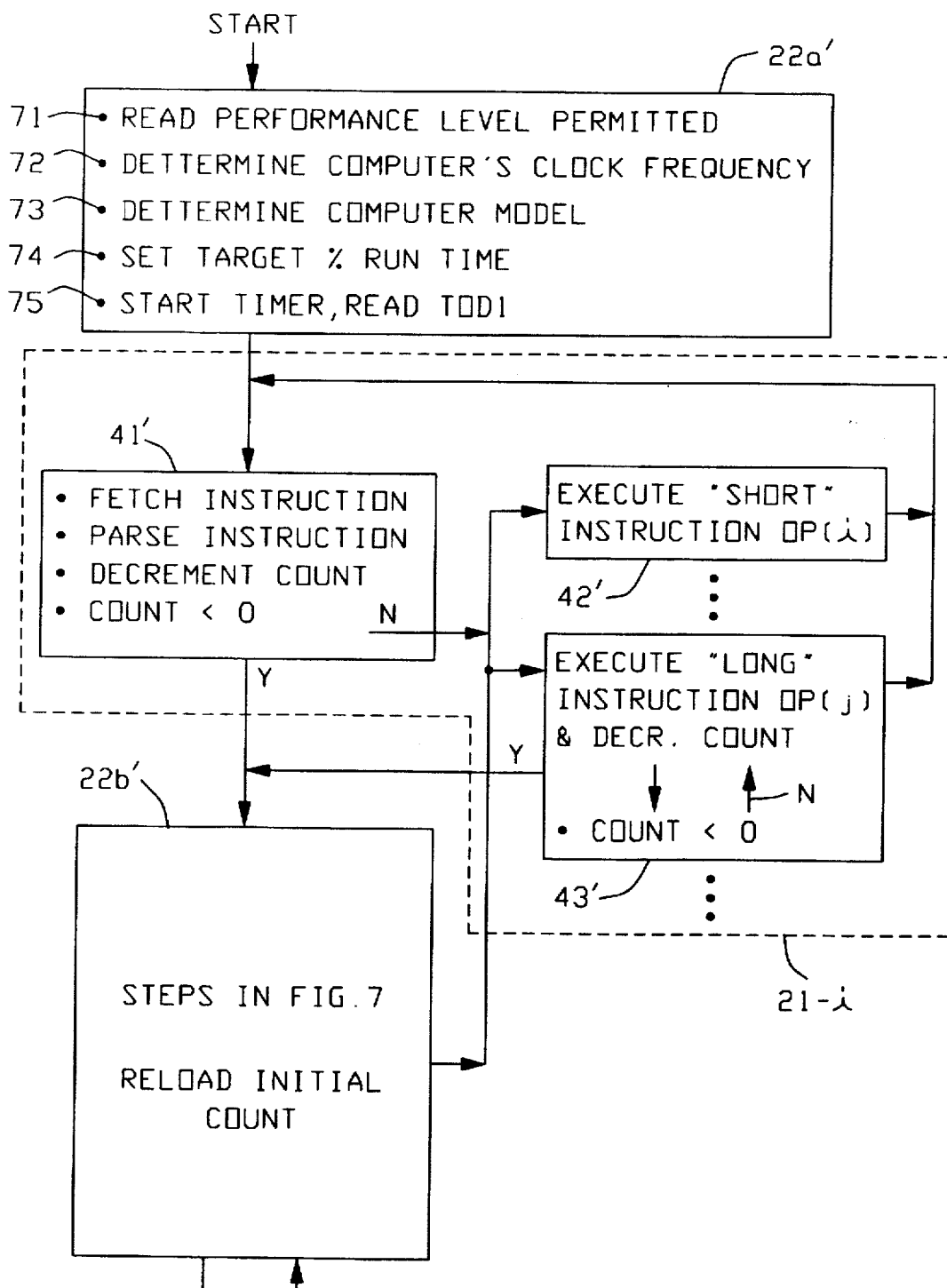
FIG. 10 shows the internal structure for a modified embodiment of the regulator program in FIG. 2.

In step 71 of FIG. 10, the regulator program reads a particular performance level, from a file, which is permitted for the application program 21-i. Next, in step 72, the regulator program determines a clock frequency at which module 10b executes instructions. These two steps 71 and 72 are the same as steps 31 and 32 in FIG. 2.

Next, in step 73, the regulator program 22a' determines the particular model of the microprocessor that is incorporated into module 10b. For example, in accordance with FIG. 9, that model can be a single Pentium™ microprocessor chip, or dual Pentium™ microprocessor chips, or a single Pentium Pro™ microprocessor chip. To perform step 73, a "CPU identification" instruction (CPUID) is executed.

In step 74, the results of the preceding steps 71-73 are used to set a target for the percent run time of the application program 21-i. Step 74 is carried out by reading an entry from a table such as in those FIGS. 4 and 9.

Next, in step 75, the regulator program loads an initial count into a register within module 10b or into a word of the memory 10a; and it reads the current time of day TOD1. This initial count is subsequently decremented past zero to thereby cause jumps from the application program to the regulator program; and thus it is an alternative to the timer which is started by step 34 in FIG. 2.

Following the above steps 71-75, the execution of the application program 21-i begins. Program 21-i is again shown as an emulator so that a comparison can be made between the embodiment of FIG. 10 and FIG. 2; however, any other type of application program can be substituted for the emulator.

In FIG. 10, three major parts 41', 42', and 43' of the emulator application 21-i are shown. Part 41' is the same as part 41 in FIG. 2 with the exception that in part 41', the count is decremented by one and tested for a value of less than zero. Part 42' is identical to part 42 in FIG. 2. Part 43' is the same as part 43 in FIG. 2 except that the count is again decremented by one and tested for a value of less than zero.

When a count of less than zero is detected, a jump is taken to part 22b' of the regulator program which includes all of the steps 60-69 of FIG. 7. By step 61, the delay Δ is determined which will reduce the actual present run time of the application program 21-i to the target. If that delay Δ is less than the preset threshold amount, then a return jump is immediately taken back to the application program. Otherwise, by step 65, a branch is taken to the operating system with the request to return after a delay of at least Δ occurs. After that delay is completed, steps 66-69 of the FIG. 7 regulator program are performed. Then, the initial count is reloaded into the register or memory word, and a return jump is taken back to the application program 21-i.

With both the FIG. 10 embodiment of the regulator program and the FIG. 2 embodiment, the steps of determining the delay Δ which will reduce the actual percent run time to the target can be performed by executing just a few instructions in module 10b. Consequently, for each case where the delay Δ does not exceed the threshold, very little time is consumed by the regulator program.

Preferably in both FIG. 2 and FIG. 10, each jump to the regulator program and immediate return to the application program without an inserted delay, is limited to occur in less than one percent of the time between any two successive jumps to the regulator program. This insures that the regulator program presents only an insignificant amount of overhead.

Also preferably in the FIG. 10 embodiment, the initial count, which is loaded in block 22a' of the regulator program and reloaded in block 22b', is increased by the regulator program as the clock frequency CK of module 10b increases. This insures that the time between any two successive jumps to the regulator program stays essentially constant, such as at 20 MS. Thus the amount of overhead which is due to the regulator program stays insignificant as the clock frequency CK increases.

One particular method of determining the computer's clock frequency is comprised of substeps 32a–32j in FIG. 3. But as a modification to FIG. 3, substeps 32a, 32c, 32f and 32g can be changed to read the machine cycle counter; substeps 32b and 32g can be changed to read the time of day, and substeps 32d and 32i can be changed to compare the machine cycle counts respectively from substeps 32a–32c and 32f–32g. If the difference between two machine cycle counts is less than a preset limit, such as three thousand, then no interrupt could have occurred between the reading of those counts.

Several preferred embodiments of the invention have now been described in detail. In addition, however, various changes and modifications can be made to the details of the preferred embodiments without departing from the nature and spirit of the invention. Accordingly, it is to be understood that the invention is not limited to the details of any one particular embodiment but is defined by the appended claims.

What is claimed is:

1. A method of regulating the performance of an application program in a digital computer, said method being performed by said computer and comprising the steps of:

sensing by a regulator program in said computer, a clock frequency at which said computer operates;

setting, by said regulator program, a target for a percent run time of said application program on said computer as a function of said clock frequency and a particular performance level which is to be achieved;

executing said application program on said computer such that jumps are taken repeatedly to said regulator program;

continuing with said executing step, following each of said jumps, after inserting a respective time delay if the actual percent run time of said application program on said computer exceeds said target; and otherwise continuing with said executing step without inserting said delay; and, initiating each respective time delay by branching from said regulator program to an operating system in said computer with a request to insert a particular delay, and wherein said operating system responds by enabling said computer to execute other programs during a time period which equals or exceeds said particular delay.

2. A method according to claim 1 wherein each respective time delay is inserted, by said regulator program, with a variable duration which increase as said actual percent run time minus said target increases.

3. A method according to claim 1 wherein each respective time delay is selected, in said regulator program, by the substeps of determining the total run time of said application program and the total time which continuously elapsed since said run time began, and selecting said respective time delay such that said target equals said total run time divided by the sum of said total time which continuously elapsed and said respective time delay.

4. A method according to claim 1 wherein each respective time delay is selected, in said regulator program, by the substeps of determining the total run time of said application program and the total delay which was inserted by said regulator program since said run time began, and selecting said respective time delay such that said target equals said total run time divided by the sum of said total run time and said total delay and said respective time delay.

5. A method according to claim 1 wherein each respective time delay is inserted only with a duration which exceeds a predetermined minimum threshold.

6. A method according to claim 1 wherein said sensing step includes the substeps of taking a pair of readings from a time of day clock in said computer and one reading between said pair from a machine cycle counter in said computer; executing a series of instructions; repeating said taking step; and setting said clock frequency to the difference between the readings from said machine cycle counter divided by the difference between two readings from different pairs of said time of day clock, only if the time of day readings in each pair differ by less than a predetermined limit.

7. A method according to claim 1 wherein said sensing step includes the substeps of taking a pair of readings from a machine cycle counter in said computer and one reading between said pair from a time of day clock in said computer; executing a series of instructions; repeating said taking step; and setting said clock frequency to the difference between two readings of different pairs from said machine cycle counter divided by the difference between the readings from said time of day clock, only if machine cycle counter readings in each pair differ by less than a predetermined limit.

8. A method according to claim 1 wherein said step of setting said target percent run time includes the substeps of providing a table in said regulator program which correlates several percent run times to corresponding combinations of clock frequency and performance levels; and using said clock frequency from said sensing step and said particular performance level to select said target percent run time from said table.

9. A method according to claim 1 wherein said sensing step includes the substep of detecting, by said regulator program, a particular model for said computer; and wherein said target percent run time is set by the combination of said model and said clock frequency and said particular performance level.

10. A method according to claim 1 wherein said jumps in said executing step are initiated by a timer circuit in said computer which runs in parallel with the execution of said application program.

11. A method according to claim 1 wherein said jumps in said executing step are initiated by a count which is changed by instructions that are executed sequentially with said application program.

12. A method according to claim 1 wherein each jump to said regulator program and subsequent continuing of said executing step without said delay, is limited to occur in less than one percent of the time between any two successive jumps to said regulator program.

13. A method according to claim 1 wherein said jumps from said executing step occur at a rate which is kept essentially constant by said regulator program even when said clock frequency increases.

14. A program storage device, readable by a computer, embodying a regulator program which performs method steps that regulate the performance of an application program in said computer; said method steps including:

sensing, by said regulator program in said computer, a clock frequency at which said computer operates;

setting, by said regulator program, a target for a percent run time of said application program on said computer as a function of said clock frequency and a particular performance level which is to be achieved;

executing said application program on said computer such that jumps are taken repeatedly to said regulator program;

continuing with said executing step, following each of said jumps, after inserting a respective time delay if the actual percent run time of said application program on said computer exceeds said target, and otherwise continuing with said executing step without said delay; and, initiating each respective time delay from said regulator program by branching to an operating system in said computer with a request to enable said computer to execute other programs during said respective delay.

* * * * *